US 8,185,097 B2

(12) United States Patent
Vanderlinden et al.

(10) Patent No.: US 8,185,097 B2
(45) Date of Patent: May 22, 2012

(54) SYSTEM AND METHOD FOR LOCKING AND BRANDING A MOBILE COMMUNICATION DEVICE TO A NETWORK

(75) Inventors: Nigel Vanderlinden, Berkshire (GB); Vikhyat Sharma, Waterloo (CA)

(73) Assignee: Research In Motion Limited, Waterloo (CA)

( * ) Notice: Subject to any disclaimer, the term of this patent is extended or adjusted under 35 U.S.C. 154(b) by 469 days.

(21) Appl. No.: 12/395,476

(22) Filed: Feb. 27, 2009

(65) Prior Publication Data
US 2010/0222047 A1    Sep. 2, 2010

(51) Int. Cl.
*H04M 3/00* (2006.01)
(52) U.S. Cl. ........ 455/418; 455/419; 455/410; 455/411; 455/435.1; 455/550.1
(58) Field of Classification Search .................. 455/410, 455/411, 418, 419, 435.1, 435.2, 550.1, 558
See application file for complete search history.

(56) References Cited

U.S. PATENT DOCUMENTS

| 5,864,757 | A * | 1/1999 | Parker ........................... 455/418 |
| 2004/0242209 | A1* | 12/2004 | Kruis et al. ................ 455/414.1 |
| 2004/0253975 | A1* | 12/2004 | Shiraogawa et al. ....... 455/550.1 |
| 2005/0037732 | A1* | 2/2005 | Kotzin ......................... 455/411 |
| 2007/0129057 | A1* | 6/2007 | Xu et al. ...................... 455/410 |
| 2009/0061840 | A1* | 3/2009 | Fleischman et al. ......... 455/419 |
| 2009/0247124 | A1* | 10/2009 | de Atley et al. ............... 455/410 |

FOREIGN PATENT DOCUMENTS
WO    2008074396 A    6/2008
* cited by examiner

*Primary Examiner* — Marivelisse Santiago Cordero
*Assistant Examiner* — Dung Hong
(74) *Attorney, Agent, or Firm* — Novak Druce + Quigg LLP

(57) ABSTRACT

There is disclosed a system and method for locking and branding a generic mobile communication device to a carrier network. In an embodiment, the method comprises: inserting in the device a subscriber or user identification module specifying a selection of a carrier network to which the mobile communication device is to be wirelessly connected; issuing from the device a request to lock and brand the device to the selected carrier network; in response to the request, receiving a customized configuration file for the selected network containing a device locking command, and one or more branding commands to brand the device to the selected carrier network; executing the device locking command to lock the device to the selected carrier network; and executing the one or more branding commands to brand the device to the selected carrier network with one or more customized features specific to the selected carrier network.

14 Claims, 5 Drawing Sheets

SYSTEM AND METHOD FOR LOCKING AND BRANDING A MOBILE COMMUNICATION DEVICE TO A NETWORK

FIELD OF THE INVENTION

The present invention relates generally to a system and method for locking and branding a mobile communication device to a network.

BACKGROUND

Currently, mobile communication devices are typically locked and branded to a particular carrier at the point of device manufacture or warehouse distribution. Locking and branding a device allows a degree of commercial assurance that the device will be activated on the network of the carrier to which the device is locked, and not on another carrier's network.

DETAILED DESCRIPTION

As noted above, the present invention relates to a system and method for locking and branding a mobile communication device to a network. More specifically, the system and method allows a generic mobile communication device to be "soft branded" and provisioned at a retail point-of-sale to the end user.

As noted above, today, mobile communication device locking and branding is typically performed at the point of device manufacture or distribution into a market by a distributor. Device locking and branding provides a degree of commercial assurance that a user will not immediately migrate to another carrier, and in conjunction with a service contract, this may encourage a carrier to subsidize the cost of the device which may significantly reduce the device purchase price for the end user.

However, due to significant cost, device locking and branding services are traditionally offered only to carriers of significant device volumes. Where the device is being sold through multiple carriers networks in multiple markets, this may sometimes result in inflexible distribution channel inventories where some carriers may be oversupplied, while at the same time other carriers are short on supply. In this case, in order to redistribute device inventory, the devices may have to be returned to the point of manufacture and/or distribution before they can be reconfigured and reframed for another network. However, this may introduce significant delays, and distributors may charge the manufacturer for device locking and soft branding services. Such soft branding requiring flashing to update software in the device may also expose sensitive software code.

As will be described below, the present system and method enables device locking and branding at the point-of-sale to the end user. This results in a far more flexible channel device inventory, and devices can be branded and provisioned on any available carrier network of the user's choice.

Figure 1:
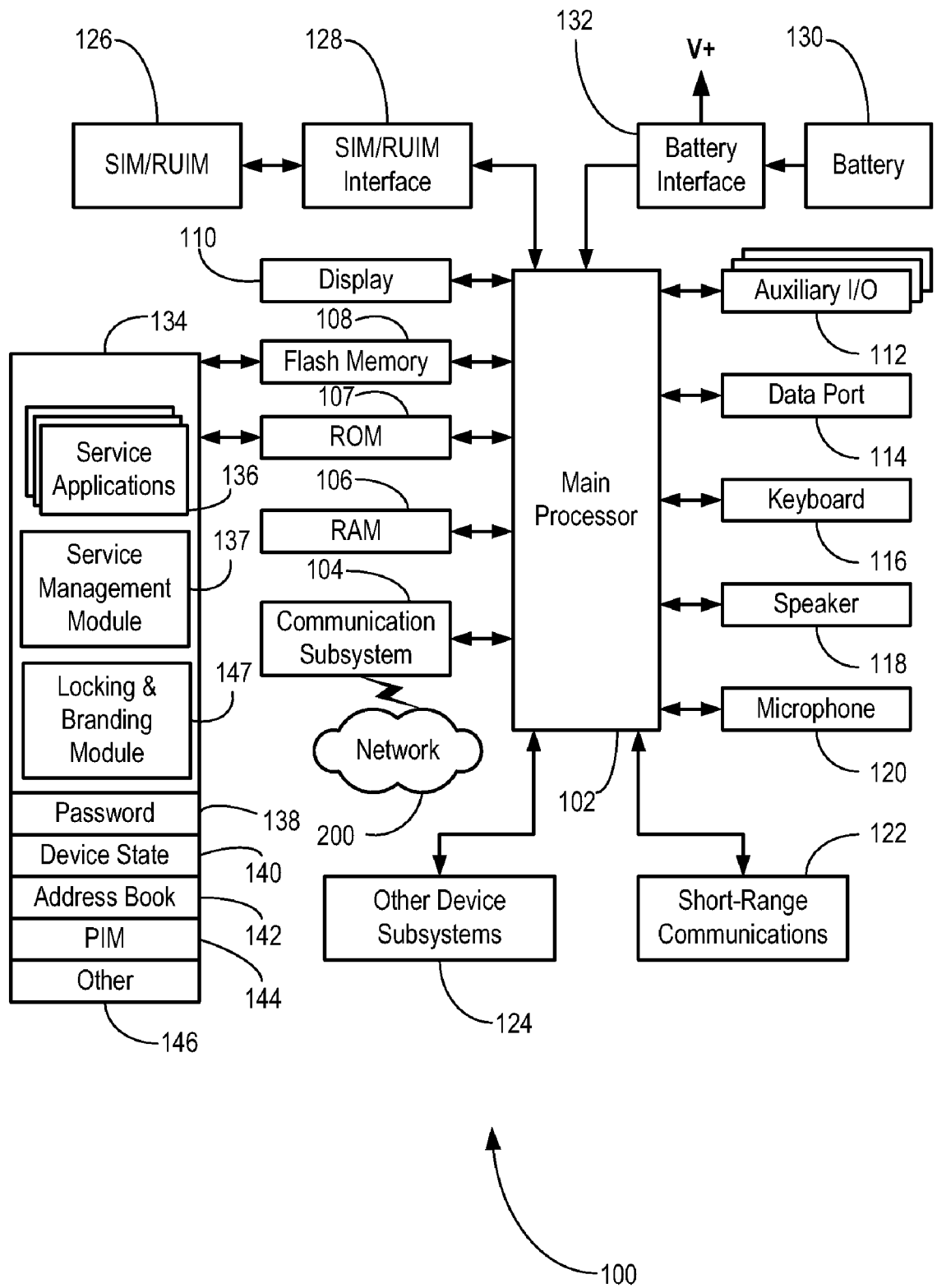
FIG. 1 is an illustration of a mobile communication device in accordance with an embodiment.

Shown in FIG. 1 is a schematic block diagram of an illustrative mobile communication device 100. The mobile communication device 100 may comprise a number of components, including a main processor 102 which controls the overall operation of device 100. Various communication functions, including data and voice communications, Internet browsing, instant text messaging, etc. may be performed through a communication subsystem 104 via wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The device 100 may be a battery-powered device and may include a battery interface 132 for receiving one or more rechargeable batteries 130 and for powering the various subsystems described above.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

Device 100 may also include a read-only memory (ROM) 107 that may store a non-alterable electronic serial number or ESN which may be burned into ROM 107 at the time of manufacture of device 100. In addition, handheld device 100 may have a unique product identification number (PIN) stored in the ROM 107, or in another memory store in device 100.

The main processor 102, in addition to its operating system functions, enables execution of software applications 134 on the device 100. The software applications 134 may control various device features and services, and may be installed on the device 100 during its manufacture, or may be subsequently loaded onto the device 100 as a software update through one of the wireless network 200, the auxiliary I/O subsystem 112, the data port 114, the short-range communications subsystem 122, or another subsystem 124.

The software applications 134 may include, for example, various communication service modules 136 (e.g. email, instant text messaging, Internet browsing, music downloading, etc.), and a password approval module 138. The software applications 134 may also include a device service provisioning module 137 for managing the service applications provisioned for device 100 on a carrier network, and a device locking and branding module 147 for locking and branding the device for a particular carrier, as will be explained in more detail further below. While device locking and branding module 147 is shown separately for clarity, it will be understood that its functions could be programmed into one of the other modules such as the device service provisioning module 137, for example.

Device 100 may further include a device state module 140, an address book 142, a personal information manager (PIM) 144, and various other modules 146.

Figure 2:
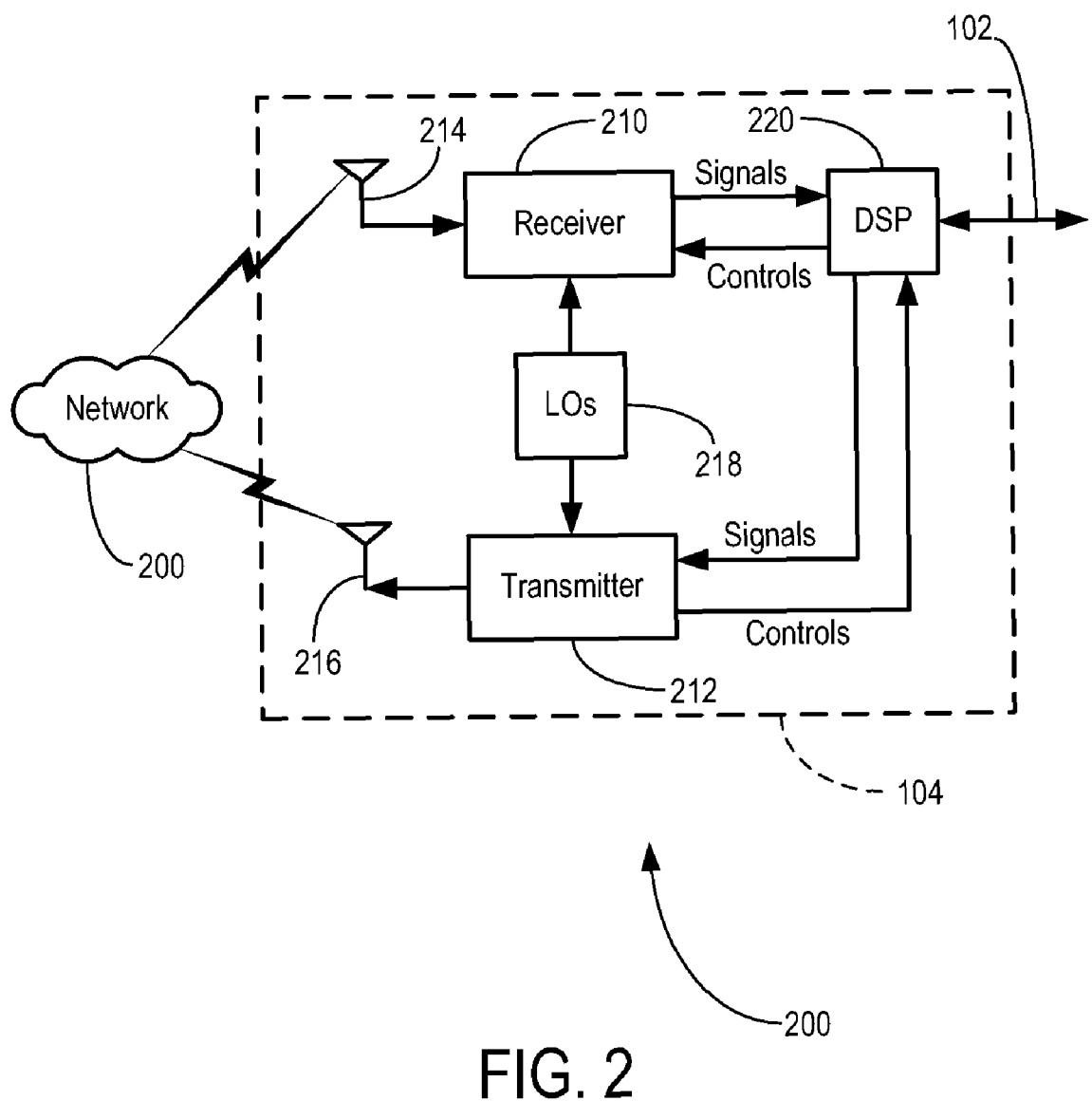
FIG. 2 is a schematic block diagram of a communication subsystem component in the device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216.

Figure 3:
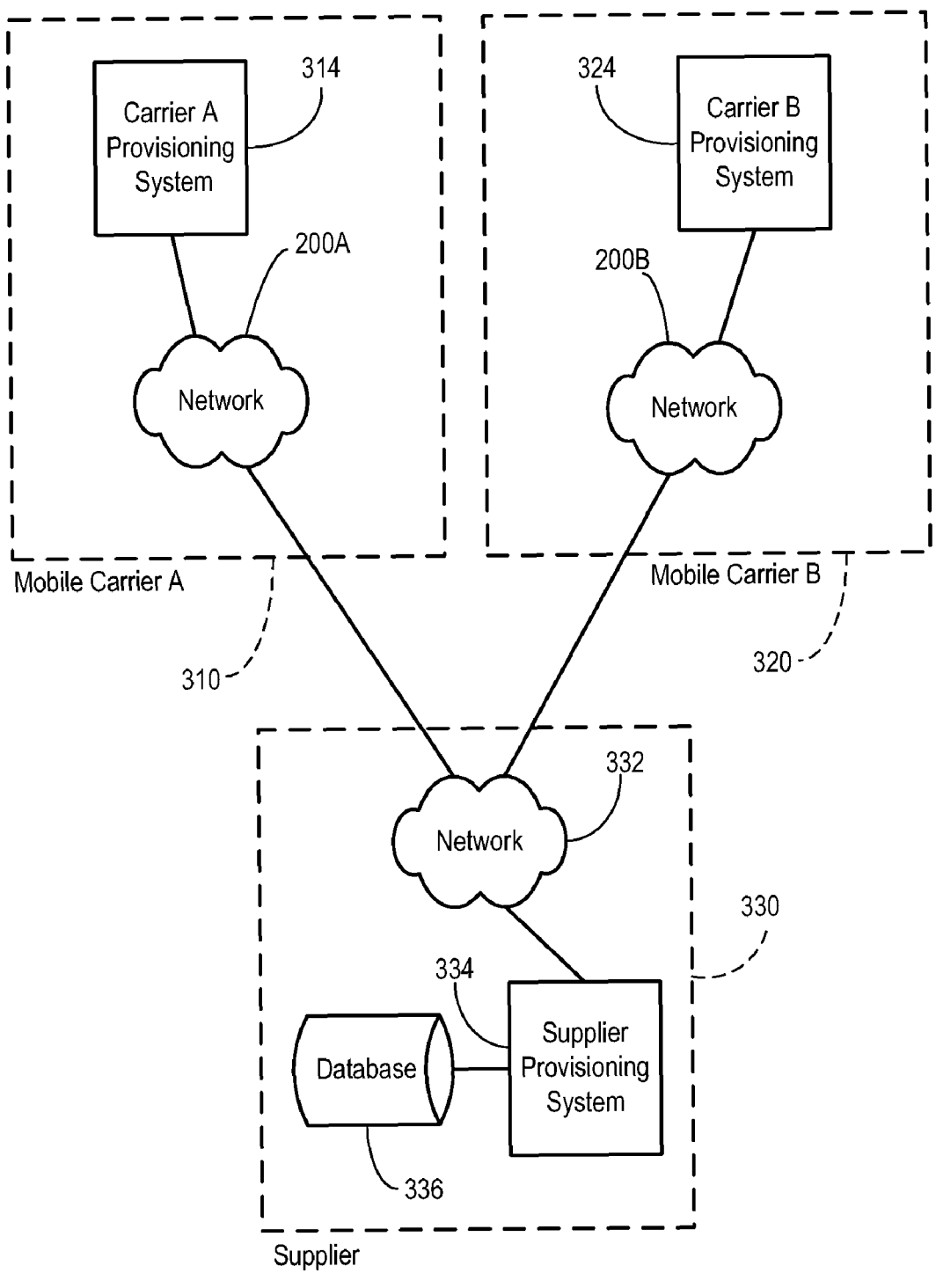
FIG. 3 is a schematic block diagram of a system in accordance with an embodiment.

Now referring to FIG. 3, shown is an illustrative schematic block diagram of a wireless networks 200A, 200B of mobile network carrier A 310 and mobile network carrier B 320, respectively. With the various components and subsystems described above, device 100 may be configured to access various services available through wireless networks 200A and 200B. As shown, each of the wireless networks 200A, 200B may have subsystems 314, 324 for provisioning various wireless services for devices 100 on their respective wireless networks. The supplier 330 may offer various communication services via network connections to the supplier 330's own network 332. The communication services may include, for example, wireless email, voice communication, instant text messaging, Internet browsing, music downloading, and various other services to subscribers on wireless networks 200A, 200B.

The supplier 330's network 332 may connect to a provisioning system 334 maintained by the supplier 330 and which may be appropriately configured to interact with subsystems 314, 324 provided on each of the wireless networks 200A, 200B. In an embodiment, provisioning system 334 may maintain a database 336 of services that have been provisioned for each of the mobile communication devices 100 on the wireless networks 200A, 200B of mobile network carrier A 310, and mobile network carrier B 320. In the database 336 of provisioning system 334, each of the devices 100 may be uniquely identified, for example, by the unique ESN burned into the ROM 107 of each device 100. Alternatively, each device 100 may be uniquely identified by the unique PIN identifier stored in ROM 107, or in another memory store in device 100. Records in database 336 may contain the unique ESN or PIN retrieved from ROM 107 or another memory store on each device 100. Of course, there are other ways of uniquely identifying a device or subscriber, such as by using a SIM (Subscriber Identity Module) module as will be described further below.

Each device 100 may thus be uniquely recognized by the supplier's provisioning system 334. Records in database 336 may also store information for the owning mobile carrier (e.g. mobile network carrier A 310, or mobile network carrier B 320), and this information may be linked to a unique identifier for device 100.

In an embodiment, each of the mobile communication devices 100 may also have a unique billing identification (BID) based on the unique identifier, or to a telephone number assigned to the device 100. This information may also be stored in the database 336 of provisioning system 334. The database 336 of provisioning system 334 may also store for each device 100 information on various services that have been provisioned for that device (e.g. email, voice, Internet access, music downloading, etc.). Use of the various services which are subscribed to may be monitored by a subscriber's unique BID, and billed appropriately to the subscriber.

Figure 4:
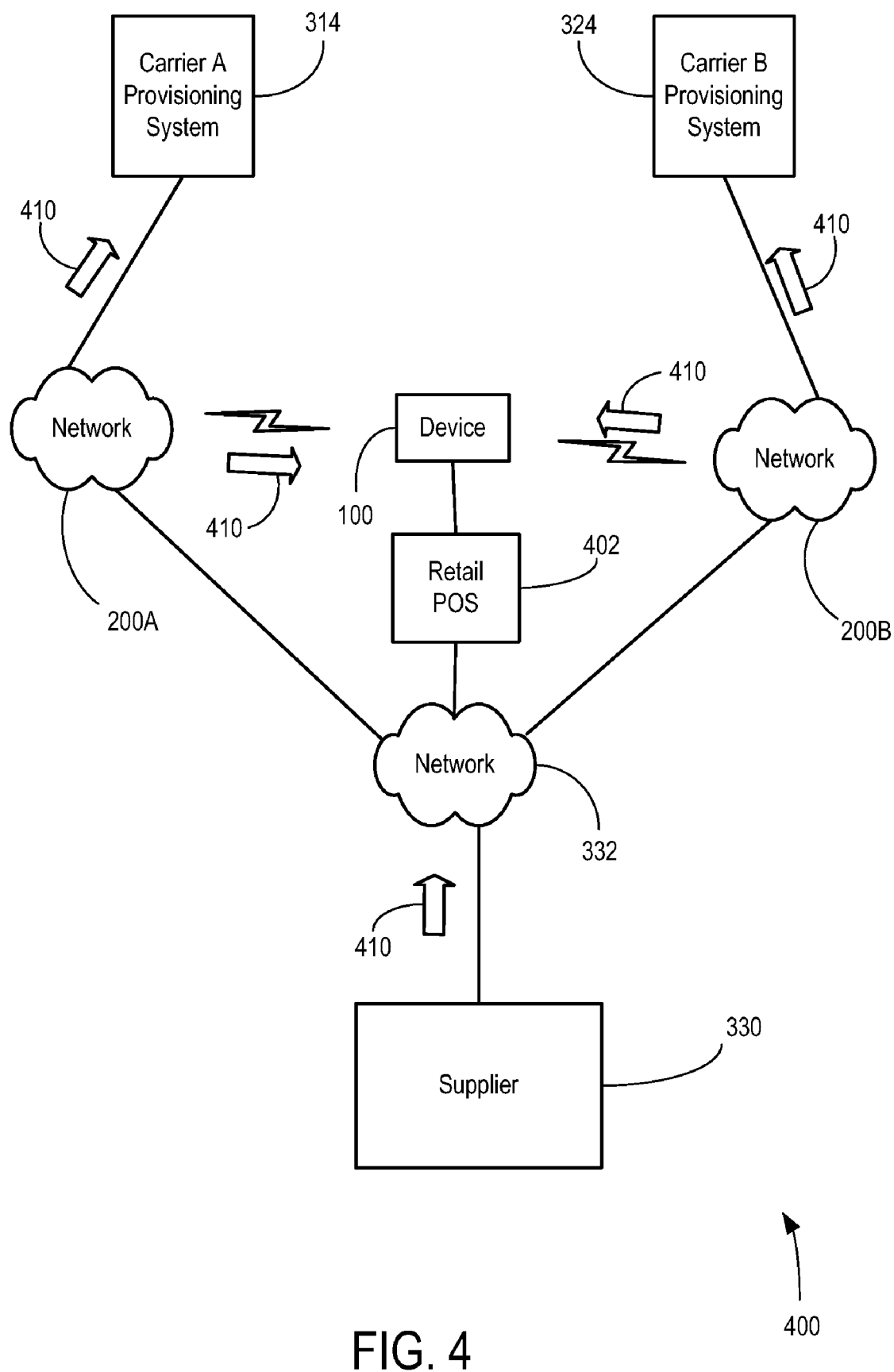
FIG. 4 is a schematic block diagram of a system in accordance with an embodiment.

Now referring to FIG. 4, shown is an illustrative system for locking and branding a mobile communication device 100 in accordance with an embodiment. In this illustrative example, device 100 has been newly purchased by a user at a retail point-of-sale (POS) and is being locked and branded for one of carrier A 310 or carrier B 320 of FIG. 3. As shown in FIG. 4, a retail POS system 402 is connected to supplier 330 via a network 332. In turn, network 332 is connected to carrier A provisioning system 314 and carrier B provisioning system 324, via their respective networks 200A and 200B.

In an embodiment, device 100 may be connected to POS system 402 via a cable, such as a USB connection for example, to allow communication with supplier 330, as well as carrier A 310 and carrier B 320. However, device 100 is also configured to be able to wirelessly communicate with carrier A 310 or carrier B 320 via their respective wireless networks 200A and 200B, and thus with supplier 330 via network 332.

For the purposes of illustration, suppose both mobile network carrier A 310 and mobile network carrier B 320 are using the GSM (Global System for Mobile Communications) standard, and assume device 100 is properly configured for connection to GSM networks. In this case, an end user may have the choice of connecting device 100 for service to either carrier A 310 or carrier B 320, depending on the user's preference of the services available from each carrier and the corresponding costs.

For connection to GSM networks, device 100 normally requires a SIM card or Subscriber Identity Module card which may contain various subscriber data including account information. The SIM card may also include programming for customized or personalized services, and may also include other subscriber data such as a phone directory. As known in the industry, a SIM card may be configured to access a particular carrier network by programming it's unique International Mobile Subscriber Identity (IMSI) number, the format of which includes a 3-digit Mobile Country Code (MCC), a 2-digit Mobile Network Code (MNC), and a 10-digit Mobile Station Identification Number (MSIN). By specifying an MCC/MNC combination, any carrier may be uniquely identified on a SIM card. By maintaining an inventory of such SIM cards for each available carrier in a market, the end user may be given the choice to select whichever carrier the user wishes to connect to.

Still referring to FIG. 4, suppose the end user purchasing device 100 has selected carrier B. In this case, the customer service agent makes note of the customer's preferred carrier and selects the appropriate SIM card for that carrier. The customer service agent then installs the SIM card for the selected carrier and activates the device 100. At this point, device 100 remains unlocked, and by simply changing the SIM card, device 100 may be used to connect to another carrier network.

In an embodiment, upon initial activation of device 100, an initial device setup icon (not shown) may be provided for selection on display 110 to activate device locking and branding module 147. Module 147 may be adapted to connect device 100 to supplier 330's network operations center (NOC) which may be available via a hardwire Internet connection, or wirelessly via the selected wireless carrier network (i.e. as specified by the inserted SIM card). Communication between module 147 and supplier 330 may be suitably secured for this purpose.

Module 147 may then present the customer service agent with a list of provisioning options for device 100. In an embodiment, the customer service agent may select a "lock and brand" option from the display 110 to initiate a request to the supplier 330 to lock and brand the device 100 to the selected carrier network. Once device 100 is locked and branded to a particular network, the device may not be used to access another carrier network even if another SIM card is inserted. While it may be possible to subsequently unlock device 100, the unlocking procedure requires specialized knowledge or unlocking instructions unavailable to most users. Thus, as noted earlier, locking and branding provides a degree of commercial assurance that the device 100 cannot easily be moved to another carrier network.

In an embodiment, the locking and branding request initiated from module 147 may be forwarded to the supplier provisioning system 334 via the supplier 330's NOC through the hard wire connection to supplier 330. Alternatively, and preferably, device 100 may forward the locking and branding request to the supplier's provisioning system 334 through the network of whichever one of the carriers A or B is selected (i.e. via wireless network 200A or wireless network 200B). As noted earlier, the supplier's provisioning system 334 is configured such that it has knowledge of all devices 100 that have been issued by the manufacturer and which may be connected to any compatible and authorized carrier network in any market.

Upon receiving the device 100 locking and branding request, the supplier provisioning system 334 may confirm the identity of device 100 making the request (e.g. via device 100's PIN, ESN or other unique identifier) and verify whether device 100 may be connected to carrier B 320's network 200B. This may include, for example, checking whether an appropriate version of the operating system (OS) is loaded on device 100. If necessary, supplier provisioning system 334 may send a command to first update the OS version to an appropriate level.

Upon confirmation that device 100 may be connected to requested carrier B 320, supplier provisioning system 334 may be configured to select or to generate a carrier specific and device specific "service book" or configuration file 410 for properly configuring device 100 for carrier B 320. This carrier specific and device specific configuration file 410 may then be transmitted to device 100 via the selected carrier B 320's network 200B, such that carrier B provisioning system 324 is notified that device 100 is to be activated on carrier B 320.

As an illustrative example, configuration file 410 may contain a command to lock device 100 to carrier B 320's network 200B. This device locking command may retrieve carrier B 320's unique MCC/MNC combination from the inserted SIM card, and writing the MCC/MNC combination to persistent storage on device 100 to "lock" the device to carrier B's network 200B, even if the SIM card is subsequently removed.

In an embodiment, configuration file 410 may further include commands adapted for execution on device 100 to "soft brand" device 100 with one or more customized features specific to carrier B 320. For example, the branding commands may include downloading and displaying a customized desktop screen image for display 110 that may include carrier B 320's company logo and graphic design. As well, soft branding commands may include commands for downloading and installing customized applications, applets, or connections to services offered by carrier B 320. Soft branding may further include links to access and download sample multimedia, such as music, ring tones, photos or videos, for example, that may be provided by carrier B 320 as an incentive for the end user to sign with their network instead of a competitor's.

Upon receiving the configuration file 410 at the device 100, commands in configuration file 410 are executed, and the device 100 becomes locked to carrier B 320. As well, device 100 is soft branded to carrier B 320 with one or more of the soft branding methods described above.

In another embodiment, one or both carrier A 310 and carrier B 320 may be CDMA (Code Division Multiple Access) networks. In this case, rather than using a SIM card, a R-UIM (Removable User Identity Module) card may be used instead. As with SIM cards, R-UIM cards may contain user or subscriber identity information, and data features that may be customized for the user. In the event that device 100 is capable of operating both in GSM and CDMA networks, for example when roaming in a jurisdiction away from home, the R-UIM card may be configured to store both GSM provisioning and CDMA provisioning information on a single card. Thus, CDMA subscribers can carry a R-UIM card in device 100 and have all of their subscription data available for a GSM network. While the wireless network standards may be different, locking and branding device 100 to a GSM network, a CDMA network, or to various other versions or types of mobile communication networks may occur in substantially the same manner as described above.

Figure 5:
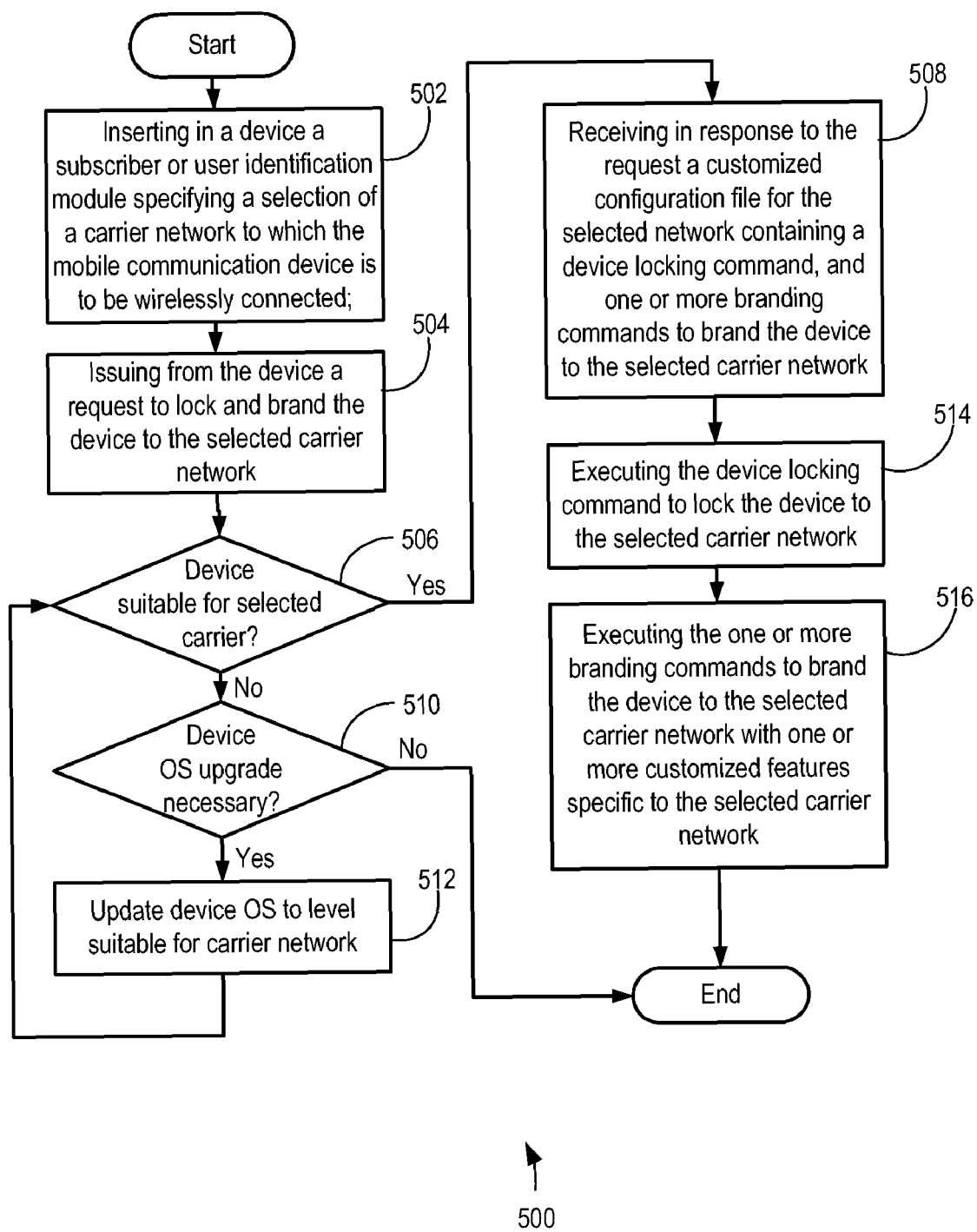
FIG. 5 is a schematic flow chart of a method in accordance with an embodiment.

Now referring to FIG. 5, shown is an illustrative method 500 in accordance with an embodiment. As shown, method 500 begins at block 502, where method 500 identifies a selection of a carrier network to which the mobile communication device is to be wirelessly connected by inserting in the device a subscriber or user identification module.

Next, method 500 proceeds to block 504, where method 500 issues from the device a request to lock and brand the device to the selected carrier network.

Next, method 500 proceeds to decision block 506, where method 500 is able to verify whether the device from which the lock and brand request is made is suitable for connection to the selected carrier network. If yes, method 500 proceeds to block 508, where method 500 receives in response to the lock and brand request a customized configuration file containing a device locking command, and one or more branding commands to brand the device to the selected carrier network.

If no, method 500 may proceed to decision block 510, where method 500 may determine if a device OS upgrade may be necessary. If yes, method 500 proceeds to block 512, where method 500 updates the device OS, and method 500 returns to decision block 506. If no, method 500 determines that the device is not suitable and ends.

From block 508, method 500 proceeds to block 514, where method 500 executes the device locking command to lock the device to the selected carrier network.

Next, method 500 proceeds to block 516, where method 500 executes the one or more branding commands to brand the device to the selected carrier network with one or more customized features specific to the selected carrier network. This may include one or more of: downloading and displaying a customized desktop screen image for the selected carrier network on the device display, downloading and installing one or more applications for execution on the device and customized for the selected carrier network, downloading and installing one or more links to access services provided by the selected carrier network, or downloading and storing one or more multi-media files including audio, ring tones, photo or video files provided by the selected carrier network. Method 500 then ends.

As will be appreciated, the above described system and method does not necessitate high volumes in order to justify the cost of locking and branding devices at the point of manufacture or distribution, and will allow smaller carriers and smaller mobile communication markets to take advantage of device locking and soft branding at the point-of-sale. This may result in smaller carriers being more likely to subsidize the cost of devices, which in turn may result in a lower end user price and increased demand for the device and associated services. As well, the manufacturer will only need to carry or maintain a limited number of device versions for various markets. Furthermore, the present system and method does not necessitate the use of a third party distributor to re-flash or customize devices for a particular market or network carrier, and therefore does not incur a charge for services or potential exposure of sensitive software code.

Thus, in an aspect, there is provided a method of locking and branding a generic mobile communication device to a carrier network, comprising: inserting in the device a subscriber or user identification module specifying a selection of a carrier network to which the mobile communication device is to be wirelessly connected; issuing from the device a request to lock and brand the device to the selected carrier network; in response to the request, receiving a customized configuration file for the selected network containing a device locking command, and one or more branding commands to brand the device to the selected carrier network; executing the device locking command to lock the device to the selected carrier network; and executing the one or more branding commands to brand the device to the selected carrier network with one or more customized features specific to the selected carrier network.

In an embodiment, executing the one or more branding commands to brand the device includes one or more of: downloading and displaying a customized desktop screen image for the selected carrier network on the device display; downloading and installing one or more applications for execution on the device and customized for the selected carrier network; downloading and installing one or more links to access services provided by the selected carrier network; and downloading and storing one or more multi-media files including audio, ring tones, photo or video files provided by the selected carrier network.

In another embodiment, the method further comprises, upon first activation of the device, wirelessly accessing the carrier network specified in the inserted subscriber or user identification module.

In another embodiment, the method further comprises allowing a supplier's provisioning system to verify whether the device is suitable for connection to the selected carrier network before sending the customized configuration file.

In another embodiment, the method further comprises installing an updated operating system (OS) version if necessary for locking and branding the device to the selected carrier network prior to receiving the customized configuration file.

In another embodiment, the selected carrier network provisioning system also receives a copy of the customized configuration file, the method further comprises allowing the selected carrier network to provision services on the device.

In another embodiment, at least some of the one or more branding commands to brand the device are executed by downloading customized features from the selected carrier network.

In another aspect, there is provided a mobile communication device configured for locking and branding to a carrier network, comprising: means for receiving a selection of a carrier network to which the device is to be wirelessly connected based on subscriber or user identification module inserted into the device; means for issuing from the device a request to lock and brand the device to the selected carrier network; means for receiving in response to the request a customized configuration file for the selected network containing a device locking command, and one or more branding commands to brand the device to the selected carrier network; means for executing the device locking command to lock the device to the selected carrier network; and means for executing the one or more branding commands to brand the device to the selected carrier network with one or more customized features specific to the selected carrier network.

In another embodiment, the means for executing the one or more branding commands to brand the device is adapted to: download and display a customized desktop screen image for the selected carrier network on the device display; download and install one or more applications for execution on the device and customized for the selected carrier network; download and install one or more links to access services provided by the selected carrier network; and download and store one or more multi-media files including audio, ring tones, photo or video files provided by the selected carrier network.

In another embodiment, the device is further adapted to wirelessly access the carrier network specified in the inserted subscriber or user identification module upon first activation of the device.

In another embodiment, the device is further adapted to allow a supplier's provisioning system to verify whether the device is suitable for connection to the selected carrier network before sending the customized configuration file.

In another embodiment, the device is further adapted to install an updated operating system (OS) version prior to receiving the customized configuration file for the selected carrier network and device if necessary for locking and branding the device to the selected carrier network.

In another embodiment, wherein the selected carrier network provisioning system also receives a copy of the customized configuration file, and the device is further adapted to allow the selected carrier network to provision services on the device.

In another embodiment, the device is further adapted to execute at least some of the one or more branding commands to brand the device by downloading customized features from the selected carrier network.

In another aspect, there is provided a computer-readable medium storing computer code that when loaded into a generic mobile communication device adapts the device to perform a method of locking and branding the device to a carrier network, comprising: code for identifying a selection of a carrier network to which the mobile communication device is to be wirelessly connected based on a subscriber or user identification module inserted into the device; code for issuing from the device a request to lock and brand the device to the selected carrier network; code for receiving, in response to the request, a customized configuration file for the selected network containing a device locking command, and one or more branding commands to brand the device to the selected carrier network; code for executing the device locking command to lock the device to the selected carrier network; and code for executing the one or more branding commands to brand the device to the selected carrier network with one or more customized features specific to the selected carrier network.

In an embodiment, the code for executing the one or more branding commands to brand the device includes one or more of: code for downloading and displaying a customized desktop screen image for the selected carrier network on the device display; code for downloading and installing one or more applications for execution on the device and customized for the selected carrier network; code for downloading and installing one or more links to access services provided by the selected carrier network; and code for downloading and storing one or more multi-media files including audio, ring tones, photo or video files provided by the selected carrier network.

In another embodiment, the computer-readable medium further comprises code for wirelessly accessing the carrier network specified in the inserted subscriber or user identification module upon first activation of the device.

In another embodiment, the computer-readable medium further comprises code for allowing the supplier's provisioning system to verify whether the device is suitable for connection to the selected carrier network before sending the customized configuration file.

In another embodiment, the computer-readable medium further comprises code for installing an updated operating system (OS) version prior to receiving the customized configuration file for the selected carrier network and device if necessary for locking and branding the device to the selected carrier network.

In another embodiment, the computer-readable medium further comprises for executing at least some of the one or more branding commands to brand the device by downloading customized features from the selected carrier network.

While illustrative embodiments have been described above, it will be appreciated that various changes and modifications may be made. More generally, the scope of the invention is defined by the following claims.

What is claimed is:

1. A method of locking and branding a generic mobile communication device to a carrier network, comprising:
   inserting in the device a subscriber or user identification module specifying a selection of a carrier network to which the mobile communication device is to be wirelessly connected;
   issuing, from the device, a request to lock and brand the device to the selected carrier network;
   allowing a supplier's provisioning system to verify whether the device is suitable for connection to the selected carrier network before sending a customized configuration file;
   installing an updated operating system (OS) version, if necessary, for locking and branding the device to the selected carrier network prior to receiving the customized configuration file;
   in response to the request, receiving the customized configuration file for the selected network containing a device locking command, and one or more branding commands to brand the device to the selected carrier network;
   executing the device locking command to lock the device to the selected carrier network; and
   executing the one or more branding commands to brand the device to the selected carrier network with one or more customized features specific to the selected carrier network.

2. The method of claim 1, wherein executing the one or more branding commands to brand the device includes one or more of:
   downloading and displaying a customized desktop screen image for the selected carrier network on a display of the device;
   downloading and installing one or more applications for execution on the device and customized for the selected carrier network;
   downloading and installing one or more links to access services provided by the selected carrier network; and
   downloading and storing one or more multi-media files including audio, ring tones, photo or video files provided by the selected carrier network.

3. The method of claim 1, further comprising:
   upon first activation of the device, wirelessly accessing the carrier network specified in the inserted subscriber or user identification module.

4. The method of claim 1, wherein the selected carrier network provisioning system also receives a copy of the customized configuration file, and the method further comprises allowing the selected carrier network to provision services on the device.

5. The method of claim 1, wherein at least some of the one or more branding commands to brand the device are executed by downloading customized features from the selected carrier network.

6. A mobile communication device configured for locking and branding to a carrier network, comprising:
   means for receiving a selection of a carrier network to which the device is to be wirelessly connected based on subscriber or user identification module inserted into the device;
   means for issuing, from the device, a request to lock and brand the device to the selected carrier network;
   means for allowing a supplier's provisioning system to verify whether the device is suitable for connection to the selected carrier network before sending a customized configuration file;
   means for installing an updated operating system (OS) version prior to receiving the customized configuration file for the selected carrier network and device if necessary for locking and branding the device to the selected carrier network;
   means for receiving in response to the request the customized configuration file for the selected network containing a device locking command, and one or more branding commands to brand the device to the selected carrier network;
   means for executing the device locking command to lock the device to the selected carrier network; and
   means for executing the one or more branding commands to brand the device to the selected carrier network with one or more customized features specific to the selected carrier network.

7. The device of claim 6, wherein the means for executing the one or more branding commands to brand the device is adapted to:
   download and display a customized desktop screen image for the selected carrier network on a display of the device;
   download and install one or more applications for execution on the device and customized for the selected carrier network;
   download and install one or more links to access services provided by the selected carrier network; and
   download and store one or more multi-media files including audio, ring tones, photo or video files provided by the selected carrier network.

8. The device of claim 6, wherein the device is further adapted to wirelessly access the carrier network specified in the inserted subscriber or user identification module upon first activation of the device.

9. The device of claim 6, wherein the selected carrier network provisioning system also receives a copy of the customized configuration file, and the device is further adapted to allow the selected carrier network to provision services on the device.

10. The device of claim 6, wherein the device is further adapted to execute at least some of the one or more branding commands to brand the device by downloading customized features from the selected carrier network.

11. A non-transitory computer-readable medium storing computer code that when loaded into a generic mobile communication device adapts the device to perform a method of locking and branding the device to a carrier network, comprising:

code for identifying a selection of a carrier network to which the mobile communication device is to be wirelessly connected based on a subscriber or user identification module inserted into the device;

code for issuing, from the device, a request to lock and brand the device to the selected carrier network;

code for allowing the supplier's provisioning system to verify whether the device is suitable for connection to the selected carrier network before sending a customized configuration file;

code for installing an updated operating system (OS) version prior to receiving the customized configuration file for the selected carrier network and device if necessary for locking and branding the device to the selected carrier network;

code for receiving, in response to the request, the customized configuration file for the selected network containing a device locking command, and one or more branding commands to brand the device to the selected carrier network;

code for executing the device locking command to lock the device to the selected carrier network; and code for executing the one or more branding commands to brand the device to the selected carrier network with one or more customized features specific to the selected carrier network.

12. The non-transitory computer-readable medium of claim 11, wherein the code for executing the one or more branding commands to brand the device includes one or more of:

code for downloading and displaying a customized desktop screen image for the selected carrier network on a display of the device;

code for downloading and installing one or more applications for execution on the device and customized for the selected carrier network;

code for downloading and installing one or more links to access services provided by the selected carrier network; and code for downloading and storing one or more multi-media files including audio, ring tones, photo or video files provided by the selected carrier network.

13. The non-transitory computer-readable medium of claim 11, further comprising code for wirelessly accessing the carrier network specified in the inserted subscriber or user identification module upon first activation of the device.

14. The non-transitory computer-readable medium of claim 11, further comprising code for executing at least some of the one or more branding commands to brand the device by downloading customized features from the selected carrier network.

* * * * *